(12) United States Patent
Shao et al.

(10) Patent No.: US 11,745,349 B2
(45) Date of Patent: Sep. 5, 2023

(54) ORIGIN CALIBRATION METHOD OF MANIPULATOR

(71) Applicant: Delta Electronics, Inc., Taoyuan (TW)

(72) Inventors: Chi-Huan Shao, Taoyuan (TW); Chi-Shun Chang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 206 days.

(21) Appl. No.: 17/318,884

(22) Filed: May 12, 2021

(65) Prior Publication Data

US 2021/0387344 A1  Dec. 16, 2021

(30) Foreign Application Priority Data

Jun. 11, 2020 (CN) .......................... 202010528372.7

(51) Int. Cl.
*B25J 9/16* (2006.01)

(52) U.S. Cl.
CPC ........... *B25J 9/1692* (2013.01); *B25J 9/1664* (2013.01)

(58) Field of Classification Search
CPC .... B25J 9/1692; B25J 9/1664; B25J 19/0095; B25J 9/1694; B25J 13/088; B25J 13/089; B25J 9/1607; B25J 9/1653; G05B 2219/39021; G05B 2219/39015; G05B 2219/39025; G05B 2219/50343; G05B 2219/39024; G05B 2219/39041; G05B 2219/39043; G05B 2219/41092; G05B 2219/41095; G05B 2219/42152; G05B 2219/39062

See application file for complete search history.

(56) References Cited

U.S. PATENT DOCUMENTS

| | | |
|---|---|---|
| 7,904,202 B2 | 3/2011 | Hoppe |
| 8,457,786 B2 | 6/2013 | Andersson |
| 10,065,319 B2 | 9/2018 | Huang et al. |

(Continued)

FOREIGN PATENT DOCUMENTS

| | | |
|---|---|---|
| CN | 101239469 B | 11/2012 |
| CN | 107643064 A | 1/2018 |

(Continued)

*Primary Examiner* — Abby Y Lin
*Assistant Examiner* — Esvinder Singh
(74) *Attorney, Agent, or Firm* — KIRTON McCONKIE; Evan R. Witt

(57) ABSTRACT

An origin calibration method of a manipulator is provided. The origin calibration method includes steps of: (a) controlling the manipulator to move in accordance with a movement command, and acquiring the 3D coordinates of the reference anchor points reached by the manipulator; (b) controlling the manipulator to move in accordance with the movement command while an origin of the manipulator being offset, acquiring the 3D coordinates of the actual anchor points reached by the manipulator, and acquiring a Jacobian matrix accordingly; (c) acquiring a deviation of a rotation angle of the manipulator according to the Jacobian matrix, the 3D coordinates of the reference anchor points and the actual anchor points, and acquiring a compensation angle value according to the deviation; and (d) updating the rotation angle of the manipulator according to the compensation angle value so as to update the origin of the manipulator.

7 Claims, 3 Drawing Sheets

(56) References Cited

U.S. PATENT DOCUMENTS

| | | | | |
|---|---|---|---|---|
| 2013/0238126 | A1* | 9/2013 | Ohta | B25J 9/1643 |
| | | | | 700/254 |
| 2015/0266183 | A1* | 9/2015 | Alifragkis | B25J 9/1692 |
| | | | | 700/254 |
| 2019/0381668 | A1 | 12/2019 | Huang et al. | |
| 2020/0306976 | A1* | 10/2020 | Yuelai | B25J 19/022 |

FOREIGN PATENT DOCUMENTS

| | | |
|---|---|---|
| CN | 110487233 A | 11/2019 |
| CN | 110722558 A | 1/2020 |
| TW | I668541 B | 8/2019 |

\* cited by examiner

ORIGIN CALIBRATION METHOD OF MANIPULATOR

CROSS-REFERENCE TO RELATED APPLICATION

This application claims priority to China Patent Application No. 202010528372.7, filed on Jun. 11, 2020. The entire contents of the above-mentioned patent applications are incorporated herein by reference for all purposes.

FIELD OF THE INVENTION

The present disclosure relates to an origin calibration method, and more particularly to an origin calibration method of a manipulator.

BACKGROUND OF THE INVENTION

Nowadays, robots are widely used in various industries. The origin of robot may be offset by accident (e.g., power outage or being impacted by external force) during operating in the work station. For solving this problem, the robot is moved out from the work station and is further moved to original manufacturer or certain environment for calibration. After the calibration for the robot is completed, the robot is moved back to the work station for continuing to operate.

However, the robot has to be moved to original manufacturer or certain environment for performing calibration, and the robot has to be moved back to the work station after calibration. The movement process causes additional time and cost and also reduces the work efficiency. Furthermore, when the calibrated robot is moved back to the work station, the calibrated robot needs to be taught points again, which also leads to a reduction of work efficiency.

Therefore, there is a need of providing an origin calibration method of a manipulator to obviate the drawbacks encountered from the prior arts.

SUMMARY OF THE INVENTION

It is an objective of the present disclosure to provide an origin calibration method of a manipulator. A measuring device is disposed in the work environment of the manipulator and utilized to realize the origin calibration for the manipulator. Therefore, if the origin of the manipulator is offset during the operation of the manipulator, the manipulator can be calibrated in the current work environment instantly. Moreover, the manipulator needs not to be taught points again after calibration. Consequently, the time and cost for calibration are reduced, and the work efficiency of the manipulator is greatly improved.

In accordance with an aspect of the present disclosure, there is provided an origin calibration method of a manipulator operating in a work space. A 3D measuring device is disposed in the work space and configured to measure a position of the manipulator. The origin calibration method includes steps of: (a) controlling the manipulator to move in accordance with a movement command, and utilizing the 3D measuring device to acquire 3D coordinates of a plurality of reference anchor points reached by the manipulator; (b) controlling the manipulator to move in accordance with the movement command while an origin of the manipulator being offset, utilizing the 3D measuring device to acquire 3D coordinates of a plurality of actual anchor points reached by the manipulator, and acquiring a Jacobian matrix according to the plurality of actual anchor points; (c) acquiring a deviation of a rotation angle of the manipulator according to the Jacobian matrix, the 3D coordinates of the plurality of reference anchor points and the 3D coordinates of the plurality of actual anchor points, and acquiring a compensation angle value according to the deviation; and (d) updating the rotation angle of the manipulator according to the compensation angle value so as to update the origin of the manipulator.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
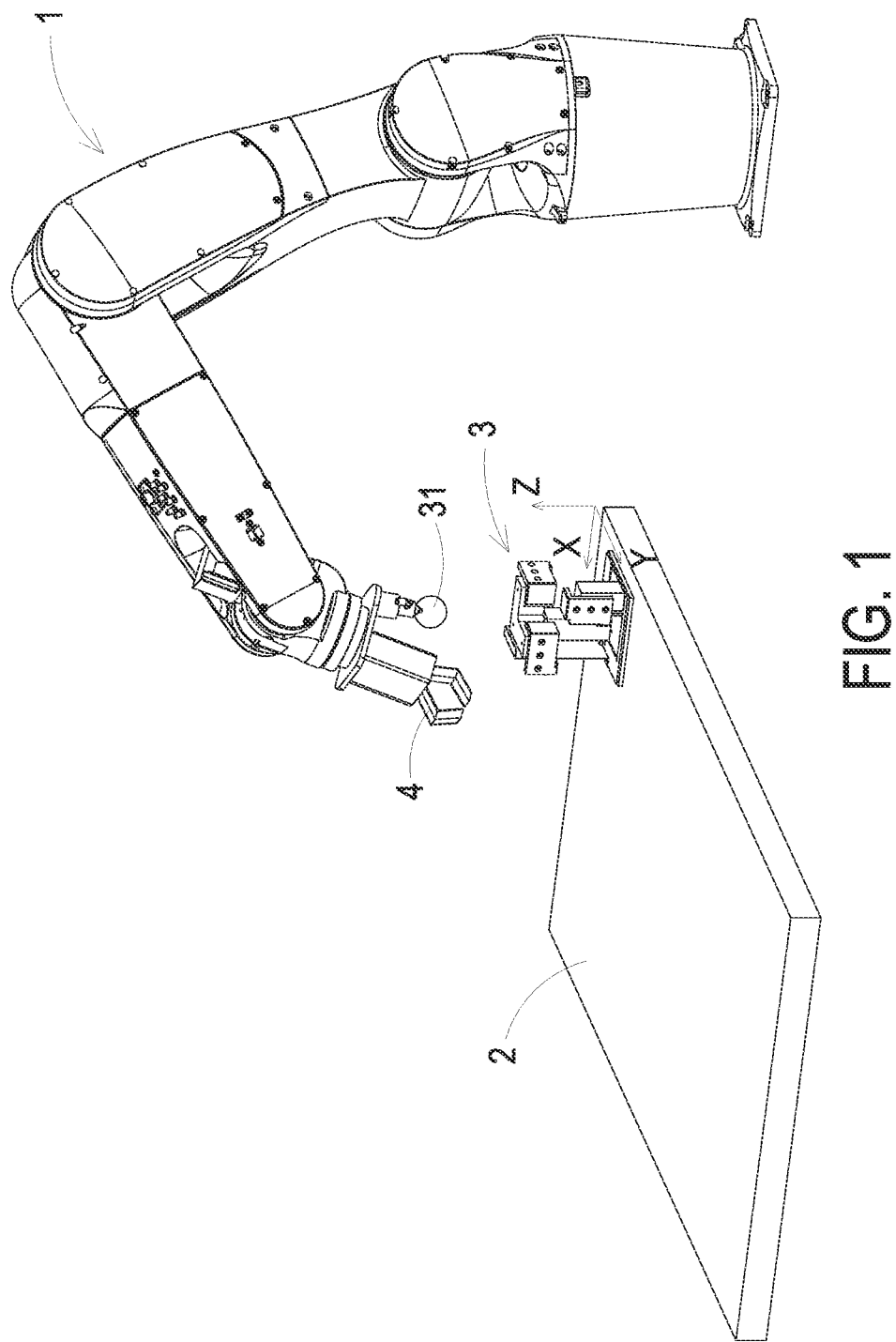
FIG. 1 is a schematic perspective view illustrating a manipulator, a work space and a 3D measuring device according to an embodiment of the present disclosure.
Figure 2:
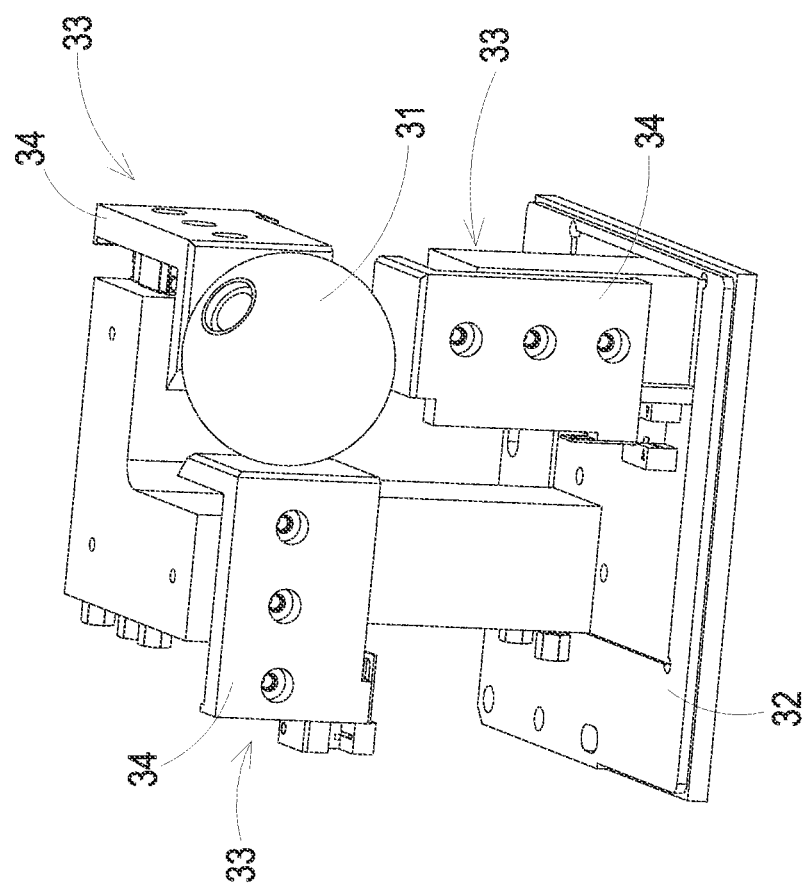
FIG. 2 is a schematic perspective view illustrating the 3D measuring device of FIG. 1.

FIG. 1 is a schematic perspective view illustrating a manipulator, a work space and a 3D (three-dimensional) measuring device according to an embodiment of the present disclosure, and FIG. 2 is a schematic perspective view illustrating the 3D measuring device of FIG. 1. As shown in FIGS. 1 and 2, the manipulator 1 is located in a work space during operation. The work space is represented by a work platform 2, but not limited thereto. A 3D measuring device 3 is disposed on the work platform 2 and configured to measure the position of the manipulator 1. In a practical application, there may be some elements or devices, which are interacted with the manipulator 1 during operation, disposed on the work platform 2. For explaining the calibration process clearly, only the 3D measuring device 3 on the work platform 2 is shown in the figures of the present disclosure. The manipulator 1 is for example but not limited to a six-axis manipulator or a SCARA manipulator. The 3D measuring device 3 includes a spheroid 31, a base 32 and three measuring modules 33. The spheroid 31 is detachably assembled to the manipulator 1 and is driven by the manipulator 1 to move or rotate synchronously. The three measuring modules 33 are all disposed on the base 32, and each of the three measuring modules 33 includes a measuring structure 34 and a position sensor. The three measuring structures 34 of the three measuring modules 33 are able to move along the X-axis direction, the Y-axis direction and the Z-axis direction respectively, and the three measuring structures 34 are all contacted with the spheroid 31. The position sensor is configured to sense the moving distance of the corresponding measuring structure 34 being pushed by the spheroid 31. The position sensor is for example but not limited to be constructed of optical scale.

During the operation of the manipulator 1, the origin of the manipulator 1 may be offset due to various unexpected conditions, for example but not limited to power outage or being impacted by external force. Under this circumstance, the origin calibration method shown in FIG. 3 is performed to calibrate the manipulator 1.

Figure 3:
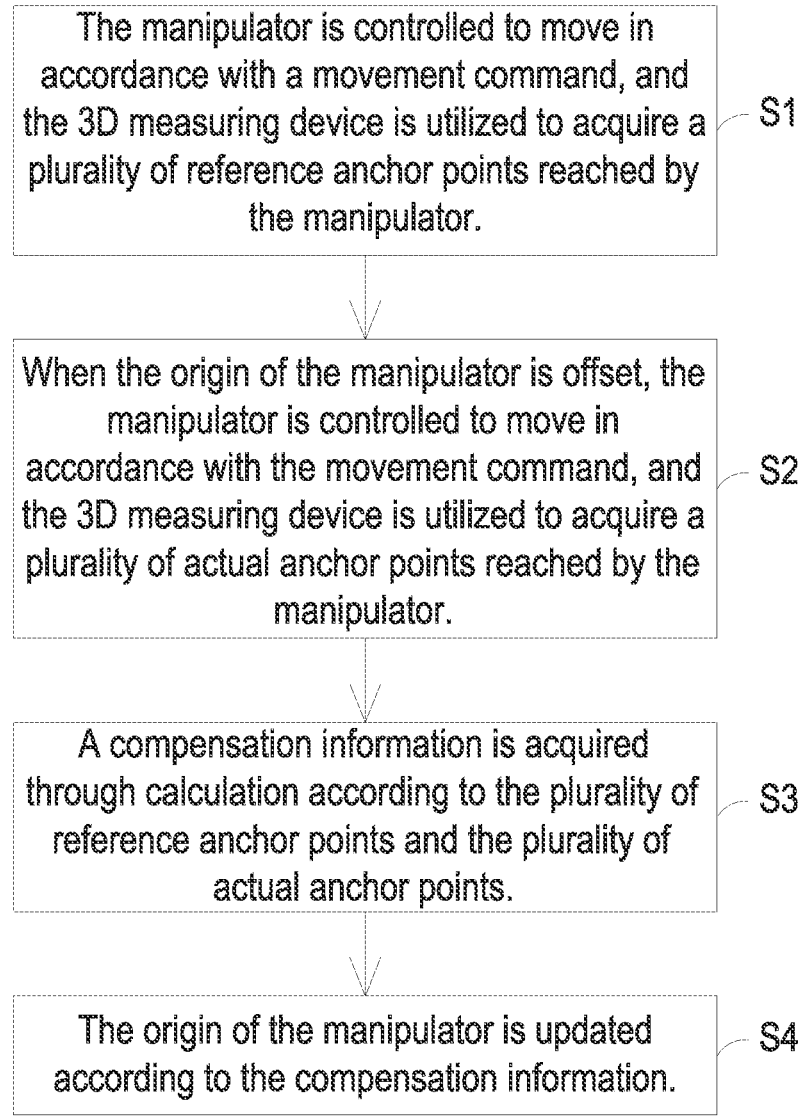
FIG. 3 is a schematic flowchart illustrating an origin calibration method of a manipulator according to an embodiment of the present disclosure.

Please refer to FIG. 3. FIG. 3 is a schematic flowchart illustrating an origin calibration method of the manipulator according to an embodiment of the present disclosure. Firstly, the manipulator 1 is controlled to move in accordance with a movement command, and the 3D measuring device 3 is utilized to acquire a plurality of reference anchor points reached by the manipulator 1 (Step S1). For example but not exclusively, the movement command includes controlling the manipulator 1 to move multiple times with different operating motions. Then, when the origin of the manipulator 1 is offset, the manipulator 1 is controlled to move in accordance with the movement command, and the 3D measuring device 3 is utilized to acquire a plurality of actual anchor points reached by the manipulator 1 (Step S2). The number of the actual anchor points is the same as that of the reference anchor points. Afterward, a compensation information is acquired through calculation according to the plurality of reference anchor points and the plurality of actual anchor points (Step S3). Finally, the origin of the manipulator 1 is updated according to the compensation information (Step S4). Therefore, if the origin of the manipulator 1 is offset during the manipulator 1 operating in the work space, the manipulator 1 can be calibrated in the work space instantly. Moreover, the manipulator 1 needs not to be taught points again after calibration. Consequently, the time and cost for calibration are reduced, and the work efficiency of the manipulator 1 is greatly improved.

Please refer to FIGS. 1, 2 and 3, the three measuring structures 34 collaboratively define a measuring space by the movable distances thereof along the X-axis direction, the Y-axis direction and the Z-axis direction respectively. In the steps S1 and S2 of the origin calibration method, the spheroid 31 is driven to move in the measuring space by the manipulator 1, and the sensing results of the three position sensors reflect the 3D coordinate of the spheroid 31. In an embodiment, in the steps S1 and S2 of the origin calibration method, the reference anchor points and the actual anchor points are the 3D coordinates of the center of the spheroid 31 measured by the 3D measuring device 3.

Since the spheroid 31 is detachably assembled to the manipulator 1, the manipulator 1 is assembled to the spheroid 31 for performing the origin calibration method shown in FIG. 3 only when there is a need of calibration. Furthermore, the manipulator 1 is assembled to the spheroid 31 only when there is a need of measuring the anchor points. Particularly, the manipulator 1 is assembled to the spheroid 31 during the steps S1 and S2 of the origin calibration method only.

In an embodiment, the manipulator 1 is assembled to a tool 4, and the tool 4 is driven to operate on the work platform 2 by the manipulator 1. In the case that the manipulator 1 is assembled to the tool 4, the manipulator 1 can be assembled to the spheroid 31 of the 3D measuring device 3 simultaneously. Therefore, if the manipulator 1 needs to be calibrated, the tool 4 needs not to be removed from the manipulator 1 before performing calibration. Because of that, there is no need to reinstall the tool 4 and perform the adjustment and calibration accordingly after the calibration is accomplished. Consequently, the calibration process is simplified, the time spent for calibration is reduced, and the work efficiency of the manipulator 1 is improved indirectly.

The way of acquiring the compensation information according to the plurality of reference anchor points and the plurality of actual anchor points is exemplified as follows.

In the step S1, the 3D coordinates of the reference points are measured by the 3D measuring device 3. In the step S2, the 3D coordinates of the actual anchor points are measured by the 3D measuring device 3, and a Jacobian matrix is acquired according to the plurality of actual anchor points. Since the origin of the manipulator 1 is offset, the rotation angle of the manipulator 1 is deviated correspondingly. Therefore, when the manipulator 1 is controlled to move in accordance with the same movement command, the actual anchor points reached by the manipulator 1 differ from the original reference anchor points. The relations among the reference anchor points, the actual anchor points and the deviation of the rotation angle of the manipulator 1 are shown in equation (1).

$$P_i - \hat{P}_i = \hat{J} \times \Delta\theta \tag{1}$$

P represents the 3D coordinate of the actual anchor point, $\hat{P}$ represents the 3D coordinate of the reference anchor point, i represents the order of the operating motion performed by the manipulator 1 in accordance with the movement command, $\hat{J}$ represents the Jacobian matrix, and $\Delta\theta$ represents the deviation of the rotation angle $\theta$ of the manipulator 1. Equation (2) is obtained from the variation of equation (1).

$$\Delta\theta = \hat{J}^{-1}(P_i - \hat{P}_i) \tag{2}$$

Therefore, in the step S3, the deviation of the rotation angle of the manipulator 1 is acquired through calculation according to the 3D coordinate of the reference anchor point, the 3D coordinate of the actual anchor point and the Jacobian matrix. Further, the compensation angle value of the compensation information is acquired according to the deviation of the rotation angle of the manipulator 1. Accordingly, in the step S4, the rotation angle of the manipulator 1 is updated according to the compensation angle value so as to update the origin of the manipulator 1. Consequently, the actual anchor points of the manipulator 1 would be consistent with the reference anchor points, and the calibration for the manipulator 1 is realized.

From the above descriptions, the present disclosure provides an origin calibration method of a manipulator. A measuring device is disposed in the work environment of the manipulator and utilized to realize the origin calibration for the manipulator. Therefore, if the origin of the manipulator is offset during the operation of the manipulator, the manipulator can be calibrated in the current work environment instantly. Moreover, the manipulator needs not to be taught points again after calibration. Consequently, the time and cost for calibration are reduced, and the work efficiency of the manipulator is greatly improved. In addition, in the case that the manipulator is assembled to the tool, the manipulator can be assembled to the spheroid of the 3D measuring device simultaneously. Therefore, if the manipulator needs to be calibrated, the tool needs not to be removed from the manipulator before performing calibration. Because of that, there is no need to reinstall the tool and perform the adjustment and calibration accordingly after the calibration is accomplished. Consequently, the calibration process is simplified, the time spent for calibration is reduced, and the work efficiency of the manipulator is improved indirectly.

While the disclosure has been described in terms of what is presently considered to be the most practical and preferred embodiments, it is to be understood that the disclosure needs not be limited to the disclosed embodiment.

What is claimed is:

1. An origin calibration method of a manipulator, wherein the manipulator operates in a work space, a 3D measuring device is disposed in the work space and configured to measure a position of the manipulator, and the origin calibration method comprises steps of:
  (a) controlling the manipulator to move in accordance with a movement command, and utilizing the 3D measuring device to acquire 3D coordinates of a plurality of reference anchor points reached by the manipulator;
  (b) controlling the manipulator to move in accordance with the movement command while an origin of the manipulator being offset, utilizing the 3D measuring device to acquire 3D coordinates of a plurality of actual anchor points reached by the manipulator, and acquiring a Jacobian matrix according to the plurality of actual anchor points;
  (c) acquiring a deviation of a rotation angle of the manipulator according to the Jacobian matrix, the 3D coordinates of the plurality of reference anchor points and the 3D coordinates of the plurality of actual anchor points, and acquiring a compensation angle value according to the deviation; and
  (d) updating the rotation angle of the manipulator according to the compensation angle value so as to update the origin of the manipulator,
  wherein the 3D measuring device comprises:
    a spheroid detachably assembled to the manipulator and driven by the manipulator to move or rotate synchronously;
    a base; and
    three measuring modules disposed on the base, wherein each of the three measuring modules comprises a measuring structure and a position sensor, the three measuring structures of the three measuring modules move along an X-axis direction, a Y-axis direction and a Z-axis direction respectively, the three measuring structures are all contacted with the spheroid, and the position sensor is configured to sense a moving distance of the corresponding measuring structure being pushed by the spheroid,
    wherein the three measuring structures collaboratively define a measuring space by movable distances thereof along the X-axis direction, the Y-axis direction and the Z-axis direction respectively, in the steps (a) and (b), the spheroid is driven to move in the measuring space by the manipulator, and the sensing results of the three position sensors reflect a 3D coordinate of the spheroid.

2. The origin calibration method according to claim 1, wherein the movement command comprises controlling the manipulator to move multiple times with different operating motions.

3. The origin calibration method according to claim 1, wherein in the step (c), the relations among the plurality of reference anchor points, the plurality of actual anchor points and the deviation of the rotation angle of the manipulator are shown as follows:

$$\Delta\theta = \hat{J}^{-1}(P_i - \hat{P}_i),$$

where $P$ represents the 3D coordinate of the actual anchor point, $\hat{P}$ represents the 3D coordinate of the reference anchor point, i represents an order of an operating motion performed by the manipulator in accordance with the movement command, $\hat{J}$ represents the Jacobian matrix, and $\Delta\theta$ represents the deviation of the rotation angle of the manipulator.

4. The origin calibration method according to claim 1, wherein the manipulator is assembled to a tool, the tool is driven to operate in the work space by the manipulator, and the spheroid of the 3D measuring device is detachably assembled to the manipulator when the manipulator is assembled to the tool.

5. The origin calibration method according to claim 1, wherein the manipulator is assembled to the spheroid of the 3D measuring device during the steps (a) and (b) only.

6. The origin calibration method according to claim 1, wherein in the steps (a) and (b), the plurality of reference anchor points and the plurality of actual anchor points are 3D coordinates of a center of the spheroid measured by the 3D measuring device.

7. The origin calibration method according to claim 1, wherein the manipulator is a six-axis manipulator or a SCARA manipulator.

* * * * *